March 23, 1971    D. F. WILKES    3,572,141
ROLLER-BAND DEVICES
Original Filed Nov. 15, 1967

INVENTOR
DONALD F. WILKES
ATTORNEY

United States Patent Office 3,572,141
Patented Mar. 23, 1971

3,572,141
ROLLER-BAND DEVICES
Donald F. Wilkes, Albuquerque, N. Mex., assignor to the United States of America as represented by the United States Atomic Energy Commission
Original application Nov. 15, 1967, Ser. No. 683,375, now Patent No. 3,471,668, dated Oct. 7, 1969. Divided and this application Mar. 26, 1969, Ser. No. 840,566
Int. Cl. F16h 55/34
U.S. Cl. 74—89.22
6 Claims

ABSTRACT OF THE DISCLOSURE

A roller-band device which minimizes sliding friction, having rotatable members in a guideway with walls thereof spaced apart less than the summation of the diameters of the members for supporting the members, and resilient band means under tension between the guideway walls with a band portion convoluted about at least one of the rotatable members to form a free-rolling cluster and maintain the members with axes generally parallel.

This is a division of application Ser. No. 683,375 filed Nov. 15, 1967, now Pat. No. 3,471,668.

BACKGROUND OF THE INVENTION

This invention relates to devices of the type disclosed in copending U.S. application Ser. No. 643,314 by Donald F. Wilkes for Roller-Band Devices, filed May 29, 1967, now Pat. No. 3,452,175 wherein it is brought out that roller-band devices may provide a range of mechanical or electro-mechanical functions with little or no friction losses. Various operations may be achieved with such devices using a relatively small number of readily assembled parts which are capable of modular construction and microminiturization with little or no degradation or compromising of operating characteristics and parameters.

There may be instances where it would be desirable to modify or improve the roller-band devices disclosed in application Ser. No. 643,314 to apply additional or different force biasing or longitudinal forces to the rollers, to introduce additional compliance to the roller-band geometry and to modify or vary the normal forces generated by the roller-band geometry for particular applications of the devices.

SUMMARY OF INVENTION

It is therefore an object of this invention to apply new and improved force biasing to a roller-band device.

It is a further object of this invention to provide a roller-band device having increased compliance.

It is a further object of this invention to provide a roller-band device generating substantially zero resultant normal force.

Various other objects and advantages will appear from the following description of the invention, and the most novel features will be particularly pointed out hereinafter in connection with the appended claims.

The invention comprises a roller-band device having a plurality of adjacent rotatable members, a guideway having spaced apart walls for supporting and restraining said rotatable members, said walls being spaced from each other a distance less than the summation of the diameters of said members, and resilient band means supported under tension between said walls with a portion of said band means convoluted about at least one of said rotatable members for forming a free-rolling, roller-band cluster and for maintaining said members with axis parallel.

DESCRIPTION OF DRAWINGS

Embodiments of the present invention are shown in the accompanying drawings wherein.

DETAILED DESCRIPTION

Figure 1:
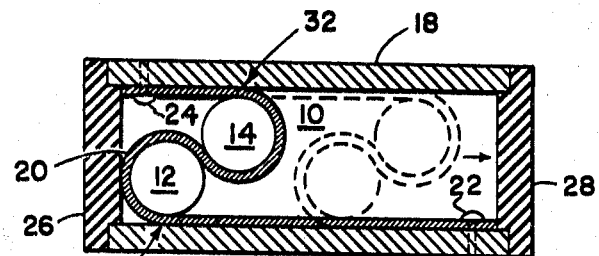
FIG. 1 is a side elevation view, partially in cross section of a basic roller-band device.

The mechanism shown in FIG. 1 illustrates various features of roller-band devices as described more fully in the aforementioned application. Roller-band device 10 includes a group or pair of adjacent rotatable members or rollers 12 and 14 supported between spaced surfaces or walls 16 and 18 of a guideway by a flexible tension band or ribbon 20 to form a stable or locked, free-rolling, roller-band cluster. (The band is illustrated with exaggerated thickness for purposes of illustration since in many applications the band may be less than .004 inch thick.) Band 20 extends in a generally S-shaped configuration partially around members 12 and 14 and may be held under tension by suitable fasteners 22 and 24, such as screws or bolts, which attach or fasten the band ends at opposite extremities and on opposing walls of the guideway. The guideway walls 16 and 18 may be supported at either end by suitable end blocks or walls 26 and 28 fastened thereto. In some applications it may be desirable to close the sides of the guideway to form a chamber or housing (not shown), in which cases, the guideway may be formed of generally square or rectangular tubing. The summation of the diameters of the rotatable members is at least slightly greater than the distance between walls 16 and 18 of the guideway so as to maintain a locked or stable, roller-band cluster. Rotatable members 12 and 14 are shown in an initial position adjacent end wall 26, with the band 20 shown departing from contact with walls 16 and 18 at contact "lines," zones or lines of tangency 30 and 32. Upon application of a suitable longitudinal force in the direction of the arrow, the roller-band cluster may rotate along the guideway walls to a second position as indicated by the dotted lines.

As the band 20 is looped or threaded around members 12 and 14 and fastened under tension by suitable means to diagonally opposite ends of walls 16 and 18 of the guideway, the band tension produces a torque which urges the rotatable members firmly toward their respective restraining walls 16 and 18 and holds their axes parallel to each other, the combined effect of band tension and restraining walls being to urge the rollers toward each other. With the rollers in the noted initial relationship, the position of the contact lines or zones may be varied to an extent by changing the tension of the band.

As brought out in the aforementioned copending application, desired force biases may be generated with roller-band device 10 by choosing one or more cutout or band cross section configurations or variations and combinations. There are some applications where it may be desirable to use a primary force biased or nonbiased tension band and rotatable member pair in conjunction with one or more secondary tension bands with or without their own rotatable members having separate force biasing to obtain desired composite force biasing. The additional secondary tension bands may act as a pusher or damping on the primary tension band.

The tension band 20 may be made of a wide range of materials or combinations thereof depending on the particular application of the device.

In order to provide flexibility and shock resistance in the tension band itself so as to maintain the desired tension, ring or maze type cutouts or corrugations may be provided at the band ends or the band may be made of an elastic material.

Figure 7:
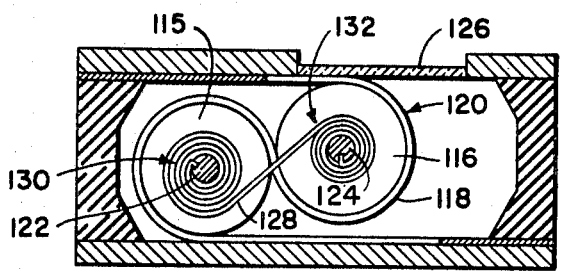
FIG. 7 is a side elevation view, partially in cross section, of a roller-band device having substantially zero resultant normal forces.

The rotatable members or rollers may be any suitable hollow or solid shape such as a cylinder or prism and variations thereof. The rollers may also be made with one or more spring biased members which may be urged outwardly against the side walls of the guideway to eliminate the need to precisely control roller lengths as is needed in some cases. Also, in some applications desired force patterns, detenting, latching, etc., may be obtained by using alternate or complex rotating member shapes. The rotatable members may also be formed in a spool shape as shown in FIG. 7.

The rotatable members may be made of a wide range of materials with or without coatings.

The guideway or housing supporting or restraining walls may be made of any suitable material depending on the application of the roller-band device such as conventional insulating materials and metals or alloys. Further, the guideway side walls may be provided with sears, wedges, electrical contacts, magnetic actuated pin latches, etc., depending on the particular application of the roller-band device.

While roller supporting walls are shown in the drawings as generally equidistantly spaced from each other as flat parallel members they may be flat arcuate members or of diverging or converging relationship with respect to each other, so long as the distance between them is at their effective operative portions not greater than the sum of the effective diameters of the rollers.

The end walls may also include various latching and detenting mechanisms as well as adjusting screws for positioning or releasing the tension band and rotatable members in or from a force bias. The end walls may be made of any suitable material depending on the application of the roller-band device and function performed by the end wall.

Figure 2A:
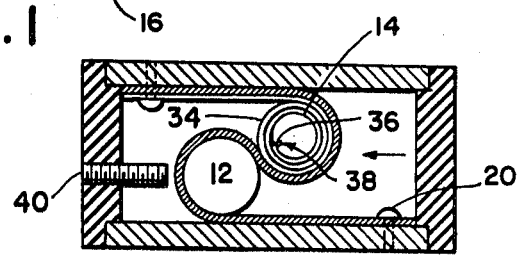
FIG. 2(a) is a side elevation view, partially in cross section, of a roller-band device modified in accordance with this invention.

FIG. 2(a) illustrates a roller-band device modified in accordance with this invention by a novel force bias generating means. The roller-band device is similar to that of FIG. 1 and includes a pair of rotatable members 12 and 14 held or locked in a stable, roller-band cluster by a flexible band 20 fastened under tension to the guideway walls in a conventional manner. A second flexible but resilient or springy band 34 may be coiled or convoluted about one of the rotatable members such as member 14, in the manner shown, and fastened thereto by a bent tongue portion 36, at the end of band 34, inserted within a slot 38 in member 14. Member 12 and band 20, in the initial position of the cluster as shown, may react against the end of adjusting screw 40 which is threaded through the end wall.

Figure 2B:
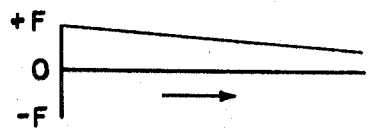
FIG. 2(b) is a diagram showing the variation of force bias over roller-band cluster displacement for the device shown in FIG. 2(a)

Assuming that band 20 has a uniform cross section and modulus of elasticity along its entire length and thus does not contribute or generate any force biasing or forces to the cluster, the suitably formed coiled resilient band 34 may generate a force bias in the direction of the arrow similar to a negative spring constant force pattern as shown in FIG. 2(b). The force pattern generated by resilient band 34 may be nonlinear as the cluster moves in either direction along the guideway due to changes in radius of the band around member 14 and the rate of change of stored energy within the resilient band. The linearity or nonlinearity of the force bias pattern generated by band 34 may be varied depending on the desired force pattern by preforming band 34 with either varying or constant radii of curvature, varying the cross-sectional dimensions of the band or combinations thereof in a manner well known in the art, such as to form a constant force spring.

Band 34 may be made of any suitable springy or resilient material such as a carbon steel or stainless steel in any conventional form such as a coil spring.

The roller-band cluster composed of members 12 and 14 and bands 20 and 34 may be biased by band 34 in the initial position as shown. The cluster may then be moved by suitable positioning means, such as adjusting screw 40, to any point on the force pattern of FIG. 2(b). The roller-band device may thus be adjusted to respond to any forces opposite to and exceeding the force bias generated by band 34. Suitable sensing means such as microswitches or electrical contacts may be positioned along the guideway surfaces or end plates to sense the movement of the cluster along the guideway in response to some predetermined force. If desired, a U-shaped cutout may be positioned on band 20 adjacent adjusting screw 40 so as to provide a tongue-like extension (not shown) which may generate a pushing force against the cluster to insure a more positive breakaway from the initial position when a force is applied. Such a device may be used as an accelerometer, or, with suitable damping means, a velocimeter.

Figure 3:
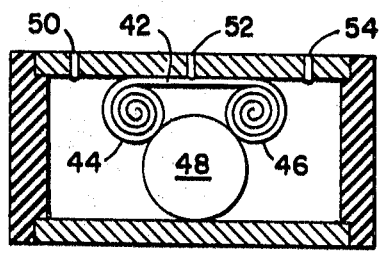
FIG. 3 is a side elevation view, partially in cross section, of a bidirectional roller-band device highly sensitive to guideway attitude and longitudinal forces.

A roller-band device may be further modified so as to be highly sensitive to the guideway attitude or level or longitudinal forces. In FIG. 3 a resilient band 42, supported on one guideway wall and having oppositely coiled end portions 44 and 46 disposed adjacent opposite sides of a rotatable member 48 supported and restrained on the opposite guideway wall, generates the desired tension and forces to form a stable, roller-band cluster. Such a mechanism may be extremely free-rolling. Coiled portions 44 and 46 may be wound upon themselves so as to effectively form rotatable members having varying diameter, as shown, or they may be coiled or convoluted around a rotatable member such as resilient band 34 in FIG. 2(a). Suitable sensing means such as electrical contacts may be positioned along a guideway surface adjacent resilient band 42 (assuming that band 42 is an electrical conductor), for instance contacts 50, 52 and 54, which may then be connected or coupled to conventional electrical utilization circuits so as to sense the movement of the roller-band cluster to either end of the guideway.

The roller-band cluster may be positioned initially in the center of the guideway, as shown. When the guideway is subjected to a longitudinal force in either direction or if the guideway is tipped or rotated about an axis parallel to the rotatable members axis, the cluster may roll along the guideway in the direction of the force or rotation and thus complete a circuit between one of the contact pairs, either contacts 50 and 52 or contacts 54 and 52. Such a device may be constructed by suitable selection of the resilience of band 42 so as to sense rotational or attitude changes of less than a degree. The diameter of member 48 should be chosen so that the combined diameter of member 48 with either coiled portion 44 or 46, when the coiled portion has been played out or partially unwound at one end of the guideway, exceeds the width of the guideway at all times so as to maintain a stable roller-band cluster. A second resilient band formed in the same manner as band 42 with coiled end portions may be substituted for member 48 by placing one of the coiled end portions in the same position as member 48 between coiled portions 44 and 46 and supporting the band on the opposite guideway wall.

Figure 4:
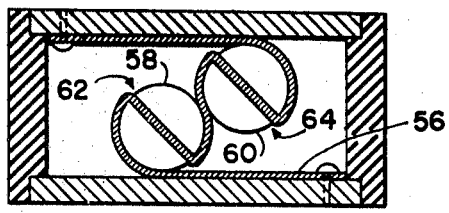
FIG. 4 is a side elevation view, partially in cross section, of a roller-band device having a novel resilient band roller support geometry.

FIG. 4 shows a modified roller-band device which utilizes a resilient band 56 convoluted or coiled about and threaded through rotatable members 58 and 60 in end slots 62 and 64 to form a stable, roller-band cluster. The extremities of resilient band 56 may be fastened in a suitable manner to opposing guideway walls at opposite ends of the guideway, as shown. Slots 62 and 64 may be centrally positioned between the ends of members 58 and 60 as well as at one end thereof and the band 56 centrally disposed around the members through the slots. The roller-band cluster illustrated in FIG. 4 may permit either of the rotatable members and band portion convoluted thereabout to roll along the guideway separately from the member or even permit both members to roll in opposite directions. Resilient band 56 may be convoluted or coiled about members 56 and 60 so as to encompass a greater portion of the members before threading through the slots so as to increase the length of cluster or roller travel along the guideway.

Figure 5A:
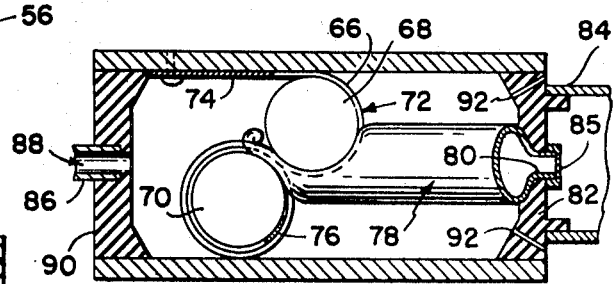
FIG. 5(a) is a side elevation, view partially in cross section, of an extrusion or mixing roller-band device.

In the embodiment of the roller-band device of this invention illustrated in FIG. 5(a), resilient band 66 may be fastened at one extremity to a wall or surface of the guideway at one end thereof, as shown, and convoluted or looped around a portion of a first rotatable member 68 and convoluted or coiled completely for several turns around a second rotatable member 70 to form a stable, roller-band cluster. Resilient band 66, as shown in greater detail in FIG. 5(b), may include a rectangular cutout 72 along a substantial portion of the band leaving solid end portions 74 and 76.

Such a roller-band device may be used to compress, squeeze or extrode some material or device between the rotatable members 68 and 70 within the cutout 72 of resilient band 66. A device, such as a compressible tube or container 78, may be positioned along the longitudinal axis of the guideway with its closed end between members 68 and 70 and preferably with minimum clearance within cutout 72 of the band. The open end or nozzle 80 of tube 78, may be positioned within or passed through a bore or hole in end block 82 facing a suitable utilization means 84. Nozzle 80 may be provided with a frangible diaphragm or barrier 85 to keep the material contained in tube 78 confined until the roller-band cluster is actuated. The nozzle may also be provided with a conventional flow control means (not shown) to control the rate of material egress from the nozzle.

The roller-band cluster may be actuated with any suitable applied longitudinal force such as by an acceleration force or, as shown, a pressurized fluid or gas. Pressurized fluids or gases may be supplied to the guideway housing from conventional pressurized tanks and valving means (not shown) through tubing 86 and a bore or opening 88 in end block 90. Ports 92 in end block 82 may be provided to assure that no pressure increase occurs ahead of the roller-band cluster due to leakage around the members and band during its travel along the guideway which may tend to impede the cluster.

In operation, the pressurized fluid or gas may be admitted to the guideway through tube 86 and bore 88. The roller-band cluster may thus be forced to roll along the guideway, squeezing or compressing tube 78. When sufficient pressure has been applied to the material within tube 78, diaphragm 85 may be ruptured permitting the material to be injected into utilization means 84. The pressure may be continued as required until a desired amount or all the material in the tube has been ejected. In order to assure complete and even emptying of the tube over the entire roller-band cluster travel, it is desirable that the number of turns or convolutions of band 66 around rotatable member 70, the position of end portion 76 and the length of travel of the guideway be selected so that the separation of members 68 and 70 may be held consant over the entire roller-band cluster travel.

In order to provide "compliance" to the cluster, it is preferred that end portion 76 of resilient band 66 not be fastened or attached to member 70, but that its position by maintained by friction coupling between the member and other portions of the band. Thus, should the roller-band cluster encounter an increased thickness in the walls of tube 78 or a lump in the material contained therein, an overstress may be applied to the resilient band's coils or convolutions around member 70 which may overcome the friction coupling, permitting portion 76 to rotatably slide clockwise on the surface of member 70 and allow the space between the members to increase so as to accommodate the obstruction. When the obstruction has passed, and, likewise the overstress, portion 76 may rotatably slide counter-clockwise on member 70, returning to its original position.

Such a roller band device may be used to inject a desired flowable material into a device upon demand. For instance, the material may be battery fluid to activate a wet-cell battery, oil to lubricate a moving part or an oxidation or reactant fluid or gas for some desired reaction. Tube 78 may be provided with two or more separate cavities or chambers separated by frangible barriers which may rupture prior to rupturing of diaphragm 85 where it is desired to premix a number of materials of reactants just prior to injection into utilization means 84. The device may be energized by conventional automatic control means in response to some external force or condition such as an acceleration force or some condition within the utilization means itself. It will also be apparent that the roller-band cluster of members 68 and 70 and band 66 may be used to extrude or form a plastic or malleable material.

Figure 6:
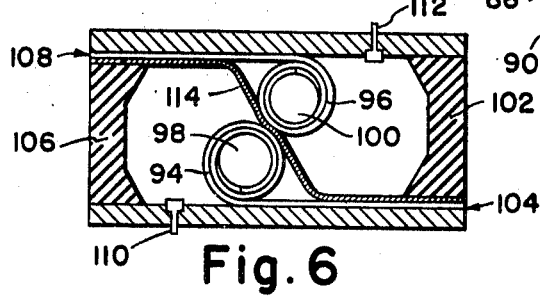
FIG. 6 is a side elevation view, partially in cross section, of a bidirectional accelerometer or attitude sensing device.

FIG. 6 illustrates another form of a bidrectionally sensitive roller-band device utilizing a pair of resilient bands. The device includes first and second resilient bands 94 and 96 coiled or convoluted around rotatable members 98 and 100 respectively. Resilient band 94 may be fastened to a wall or surface of the guideway at one end thereof and passed through end block 102 to form an electrical connection or contact 104. Resilient band 96 may be fastened to the other wall or surface of the guideway at the opposite end thereof and passed through end block 106 to form an electrical connection or contact 108. The resilient bands may be suitably convoluted or coiled about their respective rotatable members and positioned as shown and thus interact and force each other against their respective restraining walls to form a stable, roller-band cluster. The coaction of the respective bands and members may cause the roller-band cluster to assume a null or balanced force position, which may be in the center of the guideway for bands of equal force. The resilient bands may generate opposing generally increasing force biases over cluster displacement which may produce a resultant force bias having both a positive and negative component crossing the zero axis at the null position.

Suitable sensing means such as electrical contacts 110 and 112 may be positioned along diagonally opposing guideway surfaces as indicated. Bands 94 and 96 may be made of an electrically conducting material covered or coated by an insulating material except at the point or position of contact with contacts 110 and 112 respectively. Where bands 94 and 96 are electrically conductive, insulation may be provided by an auxiliary electrically insulating band or film 114 positioned between the bands as shown. Band 114 electrically isolates the bands without introducing any forces or force biases into the system. Conventional electrical utilization circuits (not shown) may be connected between contacts 104 and 110 and between contacts 108 and 112 so as to sense the movement of the roller-band cluster to either end of the guideway.

It will be apparent that functionally, two sets of roller-band clusters as shown in FIG. 5(a) may be substituted for bands 94 and 96 and members 98 and 100 of FIG. 6. Further, a damping fluid may be inserted within the guideway housing and provision made by suitable channels or orifices in the guideway walls, bands and members to provide a damping or integrating function to the cluster movement.

Assuming that a longitudinal force has been applied to the roller-band device for a time sufficient to overcome the damping action of the damping fluid, the roller-band cluster may travel the length of the guideway, depending on the direction of the applied force, and complete or close a circuit between one of the sets of contacts.

It should be noted that as the roller-band cluster progresses towards and end of the guideway in either direction, the coiled portion of one resilient band decreases in diameter as the coiled portion of the other resilient band increases. As the rate of change of the diameters of the coiled portions is constant, the coiled portions and rotatable members remain interacting in a stable, roller-band cluster. Insulating band 114 moves between the rotatable members and resilient bands under rolling friction in either direction.

The roller-band device illustrated in FIG. 6 may be used to sense or measure longitudinal forces or to sense guideway attitude or level. By utilizing relatively weak resilient or spring forces, the device may be highly sensitive to minute changes in guideway attitude or small forces. The device may also be used in association with meter movements or galvanometers where extremely weak torquing forces are employed.

Figure 5B:
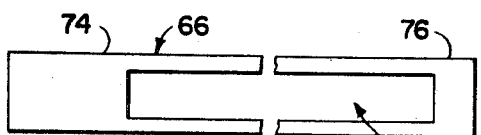
FIG. 5(b) is a plan view of the resilient band used in the device of FIG. 5(a)

In the roller-band device illustrated in FIG. 7, conventional spool-shaped rotatable members 115 and 116 may be restrained and locked in a stable, roller-band cluster between guideway walls by flexible band 118 having a central, rectangular cutout portion 120 similar to band 66 pictured in FIG. 5(b). Rotatable members may have central portions 122 and 124 of reduced diameter, as shown. The guideway walls may be of conventional construction except for a viewing portion or window 126. Window 126 may be made of any conventional transparent material including frangible materials such as glass.

Such a device may be used as a visual readout for meter measuring devices, or the like by providing markings or scales on the surfaces of either or both portions of band 118 adjoining the cutout 120. In order to increase accuracy in the movement of the roller-band cluster and consequently in the visual readout scales, it may be desirable to place the band 118 under high tensile forces. However, as the tensile force or tension on the band is increased, the normal forces generated by the cluster against the guideway walls also increase proportionally. The normal forces may be increased to such a degree as to break or shatter the window 126 when the cluster is rolled thereover.

These normal forces may be substantially or completely reduced to zero or any desired level, while continuing to maintain high tension forces required for accuracy, by use of resilient band 128. Resilient band 128 may include portions 130 and 132 coiled or convoluted in opposite directions around central portions 122 and 124 of rotatable members 115 and 116 in a generally S-shaped configuration. Bent tongue portions at either end of band 128 may be fixed or fastened to members 115 and 116 within suitable grooves or slots in central portions 122 and 124. Coiled portion 130 may be loosely wound as shown to preclude or inhibit slipping between the band coils. Due to the coaction of coiled portions 130 and 132 of resilient band 128 generating a clockwise rotation imparted to the members by the S-shaped configuration, the rotatable members and band 128 may be pulled away from the guideway walls and thus decrease the normal forces. Such a device may be designed in certain instances by suspending the roller-band cluster between end blocks without the use of guideway walls—the guideway wall restraints being in effect substituted for the S-shaped resilient band.

Roller-band devices made in accordance with the invention may be used in a wide range of industrial and household applications.

While for purposes of illustration various features are shown in different views, it will be clear that some features may be combined and embodied into a single device. It will also be understood that various changes in the details, materials and arrangements of the parts, which have been herein described and illustrated in order to explain the nature of the invention may be made by those skilled in the art within the principles and scope of the invention as expressed in the appended claims.

What is claimed is:

1. A device of the class described, comprising a plurality of adjacent rotatable members, a guideway having spaced apart walls supporting, guiding and restraining said rotatable members, said walls being spaced from each other a distance less than the summation of the diameters of said rotatable members, and resilient band means supported under tension between said walls with a portion of said resilient band means convoluted about a first rotatable member with at least one winding and looped in reverse fashion about a portion of a second rotatable member and affixed to the guideway adjacent one of said walls for forming a stable, free-rolling, roller-band cluster and providing rolling motion between said members and said band means and between said members and said walls and for maintaining said members with axes parallel, said adjacent rotatable members turning in opposite directions.

2. The device of claim 1 wherein said resilient band means has a portion intermediate the sides thereof removed and having a deformable means disposed between said rotatable members within said intermediate portion.

3. The device of claim 1 wherein said resilient band means includes a portion convoluted around rotatable members in opposing directions at opposite end portions of said band means along one wall of said guideway, said convoluted portions disposed adjacent opposite sides of a third rotatable member supported on the other of said walls.

4. The device of claim 1 wherein said resilient band means includes a first resilient band convoluted about a first rotatable member and affixed to said guideway adjacent one of said walls and a second resilient band convoluted about a second rotatable member in an opposing direction and affixed to said guideway adjacent the other of said walls.

5. The device of claim 1 wherein said convoluted portion of said band means is in the form of a rotatable member.

6. The device of claim 2 wherein said deformable means comprises a compressible tube.

References Cited

UNITED STATES PATENTS

| | | | |
|---|---|---|---|
| 192,785 | 7/1877 | Noyes | 74—242.1 |
| 1,450,906 | 4/1923 | Anderson | 74—242.1 |
| 2,948,887 | 10/1960 | Mounteer et al. | 74—89.22 |
| 3,365,978 | 1/1968 | Kirby et al. | 74—89.22 |
| 3,003,357 | 10/1961 | Votta | 74—89.2 |
| 3,134,324 | 5/1964 | Schwaninger | 74—89.2X |

FOREIGN PATENTS

| | | | |
|---|---|---|---|
| 526,230 | 6/1931 | Germany | 308—6 |

WESLEY S. RATLIFF, Jr., Primary Examiner